United States Patent [19]
Sendonaris et al.

[11] Patent Number: 6,085,106
[45] Date of Patent: *Jul. 4, 2000

[54] FORWARD LINK POWER CONTROL IN A CELLULAR RADIOTELEPHONE SYSTEM

[75] Inventors: Andrew Sendonaris, Houston, Tex.; Venugopal Veeravalli, Ithaca, N.Y.; Mohamed Landolsi, Nepean, Canada; Abdel-Ghani Daraiseh, Dallas, Tex.

[73] Assignee: Nortel Networks Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/901,979

[22] Filed: Jul. 29, 1997

[51] Int. Cl.[7] .................................. H04Q 7/20; H04Q 7/00

[52] U.S. Cl. .......................... 455/522; 455/436; 370/333

[58] Field of Search ..................................... 370/331, 332, 370/333, 334, 335, 342; 455/522, 527, 69, 68, 67.3, 67.1, 63, 226.3, 226.2, 525, 436–442, 443; 375/200, 208

[56] References Cited

U.S. PATENT DOCUMENTS

| | | | |
|---|---|---|---|
| 5,485,486 | 1/1996 | Gilhousen et al. | 455/69 |
| 5,579,373 | 11/1996 | Jang | 455/522 |
| 5,740,208 | 4/1998 | Hulbert et al. | 455/63 |
| 5,771,451 | 6/1998 | Takai et al. | 455/522 |
| 5,799,010 | 8/1998 | Lomp et al. | 370/355 |
| 5,878,328 | 3/1999 | Chaeala et al. | 455/67.1 |

Primary Examiner—Curtis A. Kuntz
Assistant Examiner—George Eng
Attorney, Agent, or Firm—John D. Crane

[57] ABSTRACT

The optimal power allocation process of the present invention allocates power between two base stations, serving a given mobile radiotelephone, during soft hand-off. A minimum total transmit power is chosen initially. The minimum total transmit power level, the path losses for each base station, the maximum transmit power for each base station, and the minimum allowed received power are all used to generate a range of values for a transmit power level multiplier, $\alpha$. The multiplier is used to allocate the total transmit power among the base stations. This process is performed until the probability of bit error is less than a maximum threshold.

9 Claims, 2 Drawing Sheets

FORWARD LINK POWER CONTROL IN A CELLULAR RADIOTELEPHONE SYSTEM

BACKGROUND OF THE INVENTION

1. Field of the Invention

The present invention relates to radio communications. More particularly, the present invention relates to base station transmit power control in a cellular radiotelephone system.

2. Description of the Related Art

A cellular radiotelephone system uses numerous base stations located throughout a geographical region. Each base station is typically equipped with three to six directional antennas to cover three to six different sectors of the cell. The antennas are typically located in the center of the cell.

When a mobile radiotelephone moves from one sector of a cell to another sector or from one cell to another cell, the radiotelephone must be handed off to that sector or cell. In code division multiple access (CDMA) cellular technology, this is typically a soft hand-off if the new sector/cell is within the same system as the sector/cell from which the mobile radiotelephone is moving.

A soft hand-off is analogous to a make-before-break switch. In other words, the mobile radiotelephone is communicating with both the old and the new base stations at the same time. After reliable communication is established with the new base station, the old base station is no longer relied upon as the primary base station.

On the reverse link, the link from the radiotelephone to the base station, the fact that more than one base station is receiving the radiotelephone's signal results in a reduced frame error rate for a given transmit power. This is a form of diversity reception that is well known to improve frame error rate in digital communication systems. Communicating with more than one base station could also result in a lower required transmit power for a given frame error rate. Both effects are highly desirable.

Additionally, the more base stations receiving a radiotelephone's signal, the lower the required transmit power for the radiotelephone. On the reverse link, in other words, it is better for the radiotelephone to be communicating with the greatest number of base stations possible during soft hand-off.

However, on the forward link, increasing the number of base stations communicating with the radiotelephone during soft hand-off has an adverse effect that may work against the potential diversity gain. Forward link interference is increased due to the fact that each base station, communicating with the radiotelephone, is transmitting to the radiotelephone using the same power. The interference reduces forward link capacity. It is very important, therefore, to minimize the transmit power from the various involved base stations.

In particular, the amount of power transmitted from each base station has to be adjusted according to the link quality between a particular base station and the radiotelephone. As an example, in a two-way soft hand-off (i.e., a soft hand-off where the radiotelephone is communicating with two base stations at the same time), one of the base stations will likely have a better link than the other base station. Since the radiotelephone's Rake receiver, well known in the art, searches for and combines a certain number of the largest multi-path components of the total received signal, these components will probably come from the link with the smallest path loss. Therefore, the performance of the Rake receiver will be roughly the same as if the base station with the lower quality link did not transmit. Additional discussion of the Rake receiver is found in Proakis, John G., Digital Communications, Chapter 14 ($3^{rd}$ Ed. 1995).

Thus, if the second base station with the lower quality link is transmitting at the same power level as the first base station with the better link, the second base station may be causing unnecessary interference to the system. This shows that the base station with the better link should transmit the radiotelephone's signal at a higher power level than the other base station.

Unfortunately, a number of issues makes this problem more complicated than just increasing the power transmitted by the station with the better link. One issue is that the multi-path profiles (i.e., the number and relative strength of arriving signal echoes or copies) from the two base stations are not the same. Thus, even though one link may have a larger path loss, the combined received signal may still have strong multi-path components from both base stations.

Another issue is that one base station should not stop transmitting since, if the radiotelephone suddenly goes into a shadow of the good link, the call will be lost. Both stations, therefore, should be received with a power that is above a certain threshold to improve robustness.

Additionally, neither base station can transmit the radiotelephone's signal at a power level higher than is permitted by the excess capacity of each base station. This implies that each base station should transmit the radiotelephone's signal at a power level that is below a certain maximum threshold value that is different for each base station.

There is a resulting unforeseen need for an optimal power allocation process for radiotelephones during soft hand-off. This power allocation process should minimize the power transmitted by both base stations while not degrading the bit error rate below a certain threshold that degrades call quality.

SUMMARY OF THE INVENTION

The present invention encompasses a process for optimal transmit power allocation between base stations in a cellular radiotelephone system. Each base station in the system transmits signals at a predetermined transmit power. Each transmitted signal has a plurality of multi-path components.

Initially, minimum and maximum transmit powers for each base station are determined. Also, a maximum threshold for the probability of bit error is generated.

The transmit power for each base station is allocated such that each predetermined transmit power is less than or equal to the maximum transmit power and greater than or equal to the minimum transmit power. Additionally, the probability of bit error for the predetermined transmit powers must be less than the maximum threshold for the probability of bit error.

DETAILED DESCRIPTION OF THE PREFERRED EMBODIMENT

Figure 1:
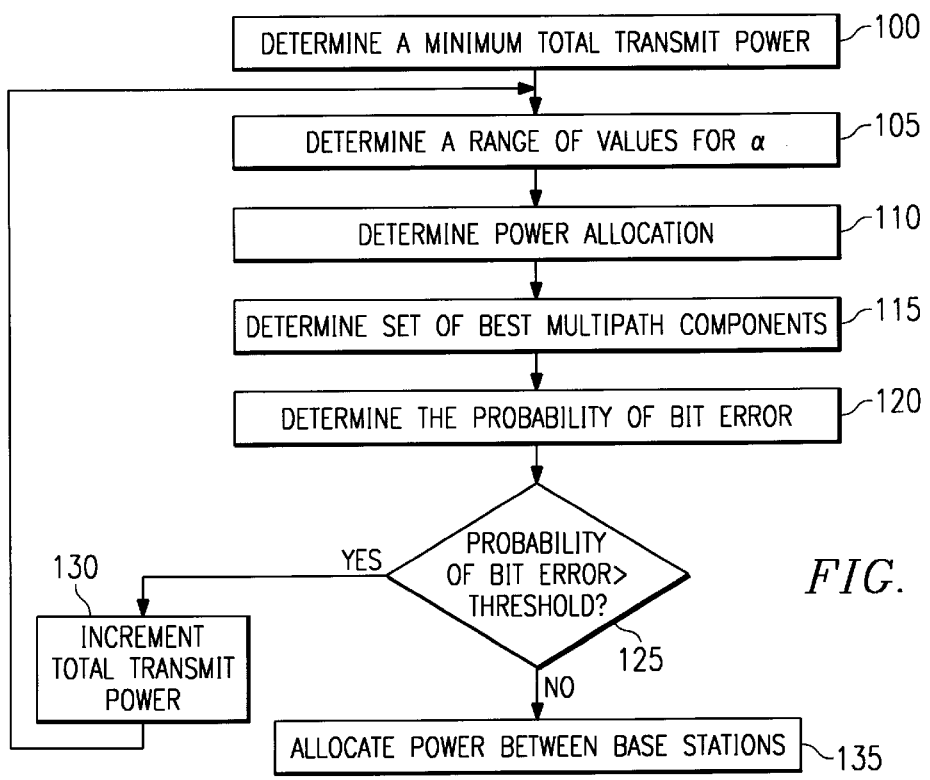
FIG. 1 shows a flowchart of the power allocation process of the present invention.

The process of the present invention optimizes forward link power control during soft hand-off between two base stations in a CDMA radiotelephone system. Instead of both base stations transmitting to the mobile at the same power level, the total power transmitted by both base stations is minimized, subject to a number of conditions.

One of these conditions is that the probability of bit error, $P_e$, resulting from the choice of transmitted power, is less than or equal to a predetermined threshold, $P_e^{max}$, the maximum allowed probability of bit error. The maximum tolerable bit error probability depends on the type of application. For example, in IS-95 voice applications, a bit error rate of approximately $10^{-3}$ corresponding roughly to a frame error rate of $10^{-2}$, is acceptable. In the preferred embodiment, a bit error rate or $P_e^{max}$ of $10^{-3}$ is assumed. Alternate embodiments use other values for $P_e^{max}$.

The determination of the probability of bit error for Rayleigh fading, multi-path channels with a Rake receiver, is well known in the art. The required calculations are found in Proakis, John G., Digital Communications, Chapter 14 ($3^{rd}$ Ed. 1995).

Another condition for the power transmitted by each base station is written as follows: $P_{thresh} \cdot L_i \leq P_i \leq P_i^{max}$. In this case, $P_i$ is the power that the $i^{th}$ base station uses to transmit the desired mobile's signal. $L_i$ is the path loss associated with the $i^{th}$ base station. $P_{thresh}$ is the minimum allowed received power. $P_i^{max}$ is the maximum allowed transmit power for the $i^{th}$ base station.

$P_{thresh}$ is the minimum power that the mobile radiotelephone can receive from the base station. In the preferred embodiment, this power is 0 mW. Alternate embodiments may require a minimum power before a signal is detected at the receiver.

In the preferred embodiment, the Rake receiver searches for and combines the three largest multi-path components of a received signal. Alternate embodiments search for more or less than the three largest multi-path components, depending on the number of fingers in the Rake receiver.

To determine which multi-path components are the three largest, for $P_e$ calculations, certain information must be known. In this case, the power transmitted by each base station, the path loss associated with each base station, and the multi-path profile for each base station must be known.

In the following analysis, $\{\beta_{ij}|i=1, 2 \; j=1, 2, 3\}$ denotes the multi-path profile of base station i, for i=1, 2 for the $j^{th}$ multi-path component of the $i^{th}$ base station. Additionally, there is the constraint that $$\sum_{j=1}^{3} \beta_{ij}^2 = 1.$$

Alternate embodiments hand-off between a larger number of base stations so that i will have additional values beyond 2.

The power of the $j^{th}$ multi-path component of the $i^{th}$ base station is written as:

$$\beta_{ij}^2 \cdot (P_i / L_i).$$

If this value is divided by the data rate R, in bits/second, and by the total interference density $I_0$, the result is equal to the $E_b/I_0$ of the $j^{th}$ multi-path component of the $i^{th}$ base station.

The impact of bit-energy-to-noise-density, $E_b/I_0$, on the error performance of the system is well known in the art and is not discussed further. Additional teachings on this signal quality metric can be found in Viterbi, Andrew J., CDMA Principles of Spread Spectrum Communication pp. 4–6 (1995). Since the Rake receiver combines the three largest multi-path components of the received signal, the resulting $P_e$ is a function of the $E_b/I_0$ of the three largest multi-path components.

The process of the present invention, illustrated in FIG. 1, begins by determining, as a starting point, a minimum total transmit power from the two base stations (step 100). This power, P, is determined by: $P = P_{thresh} \cdot L_1 + P_{thresh} \cdot L_2$. As seen in the above restrictions that, since $P_i \geq P_{thresh} \cdot L_i$, obviously the minimum transmit power for $P_1$ is $P_{thresh} \cdot L_1$ and the minimum transmit power for $P_2$ is $P_{thresh} \cdot L_2$. Therefore, the minimum total transmit power is the sum of these two transmit powers.

The minimum total transmit power is used to generate a range of values for a transmit power value multiplier, $\alpha$ (step 105). This range of values for $\alpha$ is bounded by a lower limit, subsequently referred to as $\theta_1$, and an upper limit, subsequently referred to as $\theta_2$. Both limits are determined by $P, P_{thresh}, P_i, L_i$, and $P_i^{max}$.

The allocation of power between the two base stations is determined (step 110) by $\alpha$ using the following equations: $P_1 = \alpha \cdot P$ and $P_2 = (1-\alpha) P$. As an example of the use of these equations, if $\alpha$ is set to 0.5, both base stations are transmitting at the same power.

The key to the power allocation process of the present invention is to find a minimum total transmit power P such that, for a given $\alpha$, the above criteria are met. The process increments the minimum total transmit power until it meets, by a small margin, the above stated criteria.

To find the range of values for $\alpha$, the first requirement for $\theta_1$ is derived by using two of the equations above:

$$P_1 = \alpha \cdot P$$

and $$P_1 \geq P_{thresh} \cdot L_1$$

Since $\alpha$, at its minimum, is equal to $\theta_1$, $$P_1 = \theta_1 \cdot P$$

Substituting $P_1$ back into the above equation:

$$\theta_1 \cdot P \geq P_{thresh} \cdot L_1$$

Now solving for $\theta_1$, the following boundary for $\theta_1$ is found:

$$\theta_1 \geq \frac{P_{thresh} \cdot L_1}{P}.$$

Additionally, when $P_1$ is at its minimum value, $P_2$ must be at its maximum value, $P_2^{max}$. Therefore, to find $P_1^{min}$, $P_2^{max}$ is subtracted from the total power, P:

$P_1 \geq P - P_2^{max}$, substituting for $P_1$ results in:

$$\theta_1 \cdot P \geq P - P_2^{max}$$

$$\theta_1 \geq \frac{P - P_2^{max}}{P}$$

$$\theta_1 \geq 1 - \frac{P_2^{max}}{P}.$$

Summarizing the above, it has been shown that $\theta_1$, the minimum boundary –1 for $\alpha$, must be equal to or larger than both $$\frac{P_{thresh} \cdot L_1}{P} \text{ and } 1 - \frac{P_2^{max}}{P}.$$

The derivation for finding the limitations on $\theta_2$ are similar to the above derivations for $\theta_1$.

To find $\theta_2$, the maximum boundary for $\alpha$, it is seen from above that:

$P_1$ is always less than or equal to $P_1^{max}$. Therefore: $\theta_2 P \leq P_1^{max}$. Solving for $\theta_2$:

$$\theta_2 \leq \frac{P_1^{max}}{P}$$

, yields one limitation for the upper limit of $\alpha$.

Additionally, since $P_1 \leq P - P_2^{min}$, then
$P_1 \leq P - P_{th}L_2$. Substituting for $P_1$:
$\theta_2 P \leq P - P_{th}L_2$ which is another limit on $\alpha$:

$$\theta_2 \leq 1 - \frac{P_{thresh} \cdot L_2}{P}.$$

Therefore, the upper limit on $\alpha$, $\theta_2$, must be less than both $$1 - \frac{P_{thresh} \cdot L_2}{P}$$

and $$\frac{P_1^{max}}{P}.$$

The power allocation process of the present invention next finds a set of three of the best multi-path components (step 115) for a signal transmitted from each base station. This is accomplished by determining the power of each multi-path component of each base station. The following equation illustrates this process:

$$q = \max 3\left\{\beta_{ij}^2 \cdot \frac{P_i}{L_i} \middle| i = 1, 2 \ \ j = 1, 2, 3\right\}.$$

The power allocation process finds a set of three multi-path components due to the fact that Rake receivers in present day IS-95 radiotelephones combine three multi-path components. However, the present invention is not limited to using a set of only three components. Alternate embodiments use other numbers of multi-path components.

The set of the best multi-path components is used to determine the probability of error (step 120). This determination, as noted above using the Proakis reference, is as follows:

$$P_e = \min\left\{P_e, P_e^{rake}\left(\frac{q}{R \cdot I_0}\right)\right\}.$$

where $P_e^{rake}$ is the probability of error resulting from using the Rake receiver. This probability of error is discussed in greater detail in Proakis, Digital Communications, pg. 802.

In the process illustrated in FIG. 1, if the probability of bit error is still greater than the maximum probability of error (step 125), the transmit power must be incremented (step 130). This is accomplished by multiplying the last total transmit power, P, with the increment amount. This is illustrated as:

$$P = increment(P_e, P_e^{max}) \cdot P$$

Once the power is incremented (step 130), the process of the present invention is performed again by finding a new range for a (step 105), as well as a new $\alpha$. This is done until $P_e \leq P_e^{max}$.

Once the proper total transmit power is established, the power allocation for each base station is forwarded to the respective base station (step 135). The transmitters in those base stations then use that power level until instructed to transmit at another power level.

The increment amount for the process is chosen such that the increase is not too conservative but also not too large. An increase that is too small results in the process taking a long time to settle on the correct power allocation while too large of an increase results in the solution being inaccurate and power being wasted by transmitting at too high a power level.

One embodiment for incrementing the total transmit power is to increment the last power value by 10%. This has the advantage of simplicity and will overestimate the required total power by at most 10%. However, this embodiment may be slow when the current value for P is far from the final value.

Another embodiment to increment the total transmit power is to set increment($P_e,P_e^{max}$) as follows:

$$\text{increment }(P_e, P_e^{max}) = \left(\frac{P_e}{P_e^{max}}\right)^{1/3}.$$

This embodiment has the advantage of making large increases when the value of P is far from its final value. As P gets close to the final solution, the rate of increase decreases making the result more accurate.

Another embodiment for incrementing P is as follows:

$$\text{increment }(P_e, P_e^{max}) = 1 + 2\log\left(\frac{P_e}{P_e^{max}}\right).$$

This embodiment also has the advantage of making large initial increases until P is close to the final value when the rate of increase decreases.

The above embodiments illustrating various incrementing routines are just examples of many different possible routines. The process of the present invention is not limited to these few embodiments for incrementing.

The above described optimal power allocation process depends on determining the forward link multi-path profiles from each base station. These profiles are determined by studying the reverse link multi-path profiles.

As is well known in the art, cellular base stations have a searcher in their receivers that extract the multi-path profiles of the reverse link. The searchers find the number of multi-path signals with their respective strengths. Since there is a strong correlation between the average profile of the reverse link and the average profile of the forward link, including path loss, the three best reverse link multi-path profiles are assumed to be the three best forward link multi-path profiles. Alternate embodiments use other methods for determining the forward link multi-path profiles.

Figure 2:
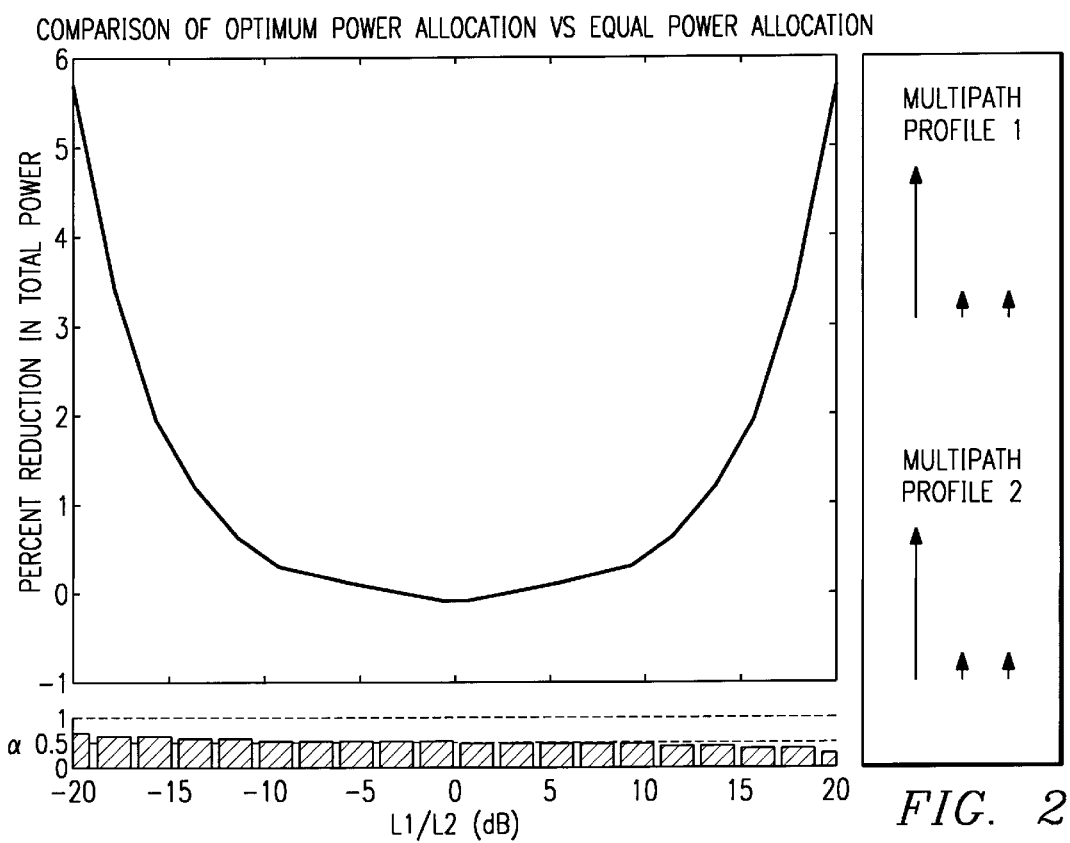
FIG. 2 shows a plot of the comparison of optimum power allocation versus equal power allocation with one non-negligible multi-path component.
Figure 3:
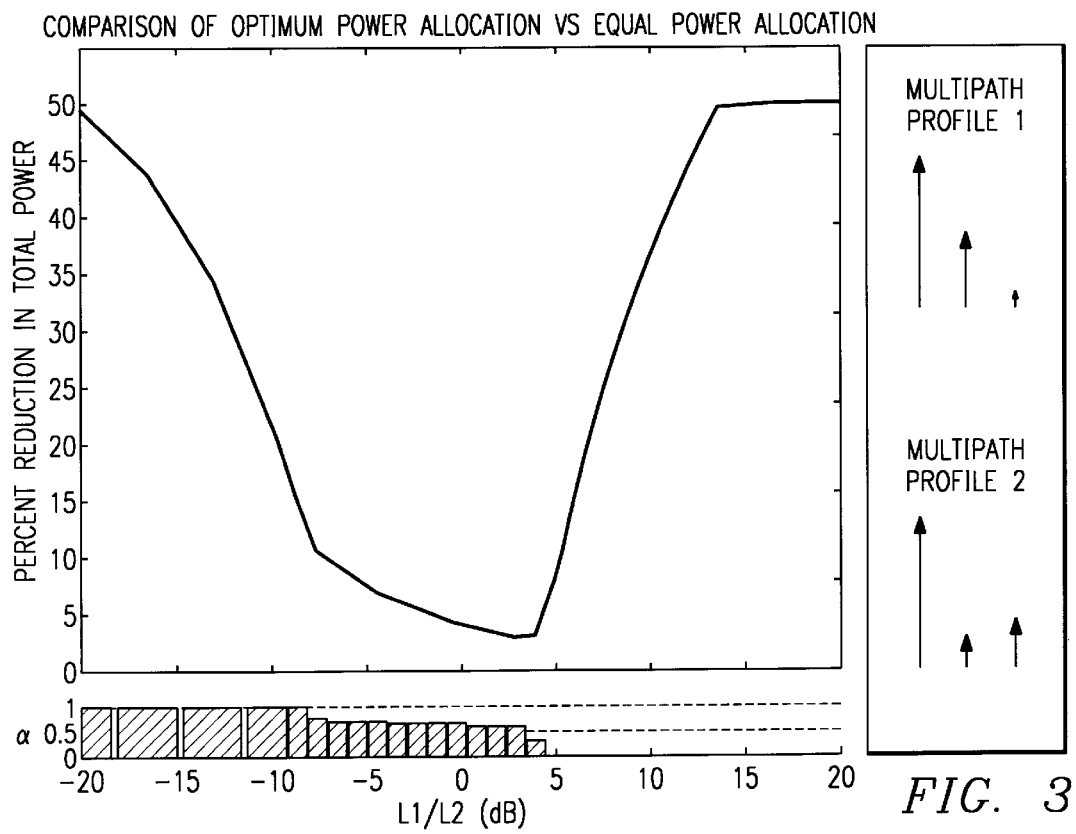
FIG. 3 shows a plot of the comparison of optimum power allocation versus equal power allocation with three non-negligible multi-path components.
Figure 4:
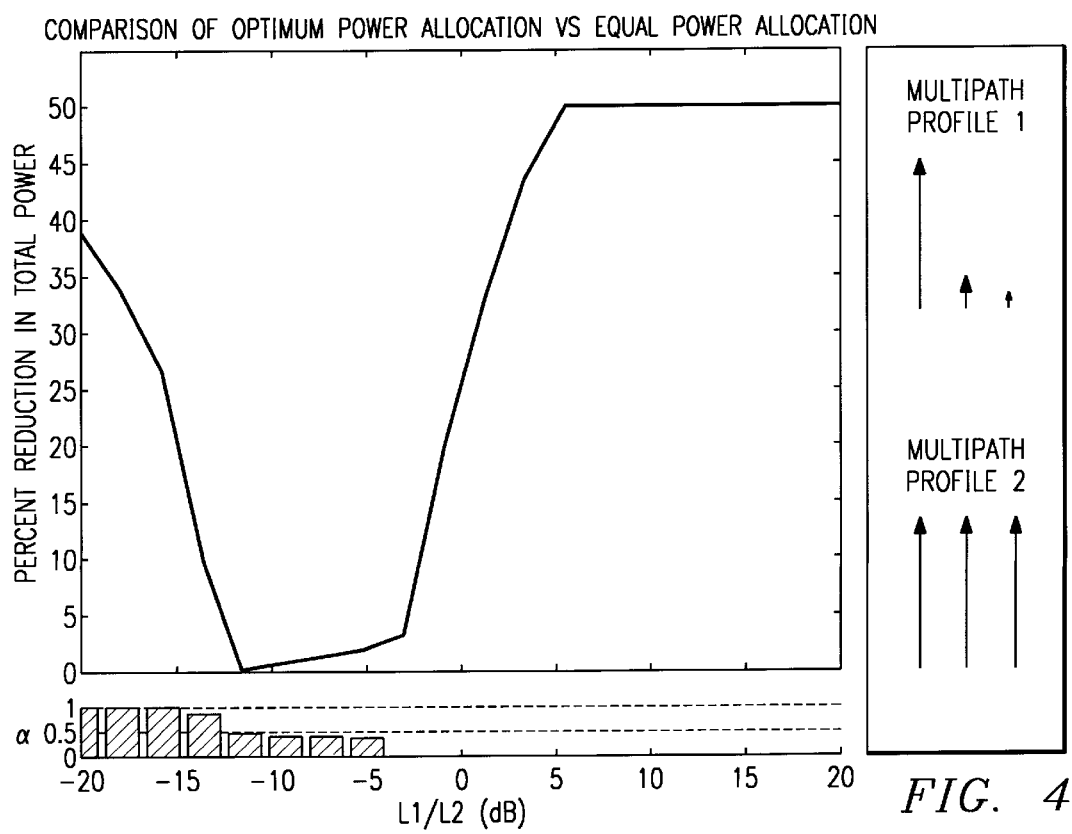
FIG. 4 shows a plot of the comparison of optimum power allocation versus equal power allocation with equal components in one profile and unequal in the other profile.

FIGS. 2–4 illustrate different scenarios involving different multi-path profiles and different path losses. In each example, the average multi-path profiles of the two base stations are fixed. These profiles are illustrated along the right side of each plot. The reduction in total power required using the optimal power allocation process of the present invention compared to a prior art process of power allocation is plotted versus the ratio of the path losses, $L_1/L_2$ from the two base stations.

For the following examples, $P_1^{max}$ and $P_2^{max}$ were set to values large enough to ensure that the $P_e^{max}$ requirement could not be met. This was done in order to get a direct comparison between the prior art power allocation process and the power allocation process of the present invention. If the optimal power allocation process of the present invention cannot satisfy the $P_e^{max}$ requirement given all of the available power, then the equal power allocation process of the prior art would also not be able to do so.

In the first example, illustrated in FIG. 2, assumes identical average multi-path profiles for each base station. The signals from each base station are experiencing equal path losses in this instance. This example shows that both the prior art power allocation process and the optimal power allocation process of the present invention are able to satisfy the $P_e^{max}$ requirement.

Moving along the curve to the right, from the center where $L_1/L_2=1$, shows a larger path loss for base station 1. This illustrates a slight savings in power in this case by favoring base station 2. The opposite would be true if you move along the curve to the left: the path loss for base station 2 would be greater and a slight power savings is gained by favoring base station 1.

The second example, illustrated in FIG. 3, shows a plot assuming typical sets of multi-path profiles. At the midpoint of the plot, α is slightly over 0.5. From the above allocation equations ($P_1=\alpha P$ and $P_2=(1-\alpha)P$), it is obvious that the power allocation process would have base station 1 transmitting at a slightly higher power level for optimum power allocation. The plot shows a power savings of approximately 5% if the path losses are equal. If the path losses are not equal, the power savings could increase.

The third example, illustrated in FIG. 4, shows the average multi-path profiles as being very non-uniform. It is clear in this example that base station 2 should be transmitting at a higher power level since it offers multi-path diversity. In that case, there is a transmit power savings of approximately 30% using the optimum power allocation process of the present invention. As above, this savings is assuming the path losses are equal. The savings could be greater for unequal path losses.

In summary, the optimal power allocation process of the present invention allocates the transmit power of multiple base stations that are communicating with a mobile radiotelephone in soft hand-off. By determining a minimum total transmit power and then allocating that power between the base stations, a power savings is obtained.

We claim:

1. A method for optimal transmit power allocation between or among plural base stations in a radiotelephone system, each base station transmitting signals at selected transmit powers and each signal having a plurality of multi-path components, the method comprising the steps of:

determining a maximum transmit power for each base station;

determining a minimum total transmit power of the plural base stations;

determining a maximum probability of bit error; and adjusting the selected transmit power for each base station on the basis of the foregoing three determining steps such that each selected transmit power is in a range of less than or equal to the maximum transmit power and greater than or equal to the minimum total transmit power, and a probability of bit error for the selected transmit powers is less than the maximum probability of bit error.

2. The method of claim 1 wherein the probability of bit error is a function of a bit-energy-to-noise-density level of a predetermined number of the multi-path components.

3. A method for optimal transmit power allocation between a plurality of base stations in a cellular code division multiple access radiotelephone system, each base station transmitting signals at a predetermined transmit power and each transmitted signal having a data rate, a noise density, and a plurality of multi-path components, the method comprising the steps of:

determining a minimum total transmit power value for the predetermined transmit power of the plurality of base stations;

determining a range of values for a transmit power value multiplier;

determining a first predetermined transmit power as the product of the minimum total transmit power value and the transmit power value multiplier;

determining a second predetermined transmit power as the product of the minimum total transmit power value and the difference between unity and the first transmit power value multiplier;

determining a set of three best multi-path components in response to the first and second predetermined transmit powers and the path loss of the base stations transmitting the first and second predetermined transmit powers;

determining a probability of error in response to the set of best multi-path components, the data rate, and the noise density; and incrementing the minimum total transmit power value by a predetermined amount if the probability of error is greater than a predetermined probability of error threshold.

4. The method of claim 3 wherein the transmit power value multiplier is a function of the predetermined transmit power for each base station, the maximum predetermined transmit power for each base station, the minimum total transmit power, and the path loss associated with each base station.

5. The method of claim 3 wherein the step of determining the range of values for a transmit power value multiplier includes the steps of:

determining a minimum value for the range of transmit power multiplier values that is greater than or equal to both $(P_{thresh} \cdot L_1)/P$ and $$1 - (P_2^{max}/P),$$

where $P_{thresh}$ is a minimum allowed received power, $L_1$ is a path loss of a first base station, P is the total transmitted power of the plurality of base stations, and $P_2^{max}$ is a maximum transmit power of a second base station; and determining a maximum value for the range of transmit power multiplier values that is less than or equal to both $P_1^{max}/P$ and $$1 - ((P_{thresh} \cdot L_2)/P),$$

where $P_1^{max}$ is the maximum transmit power of the first base station.

6. The method of claim 3 wherein the step of incrementing includes incrementing the minimum total transmit power value by a fixed percentage until the probability of error is less than the predetermined probability of error threshold.

7. The method of claim 3 wherein the step of incrementing includes incrementing the minimum total transmit power value by $$\left(\frac{P_e}{P_e^{max}}\right)^{\frac{1}{3}},$$

where $P_e$ is the probability of error and $P_e^{max}$ is the maximum allowed probability of error, until the probability of error is less than the predetermined probability of error threshold.

8. The method of claim 3 wherein the step of incrementing includes incrementing the minimum total transmit power value by $$1 + 2\log\left(\frac{P_e}{P_e^{max}}\right),$$

where $P_e$ is the probability of error and $P_e^{max}$ is the maximum allowed probability of error, until the probability of error is less than the predetermined probability of error threshold.

9. The method of claim 6, wherein the fixed percentage is approximately ten percent.

* * * * *